Feb. 5, 1957 G. V. CARLSON 2,780,327
WINDOW FRAME CONSTRUCTION
Filed April 29, 1953 3 Sheets-Sheet 1
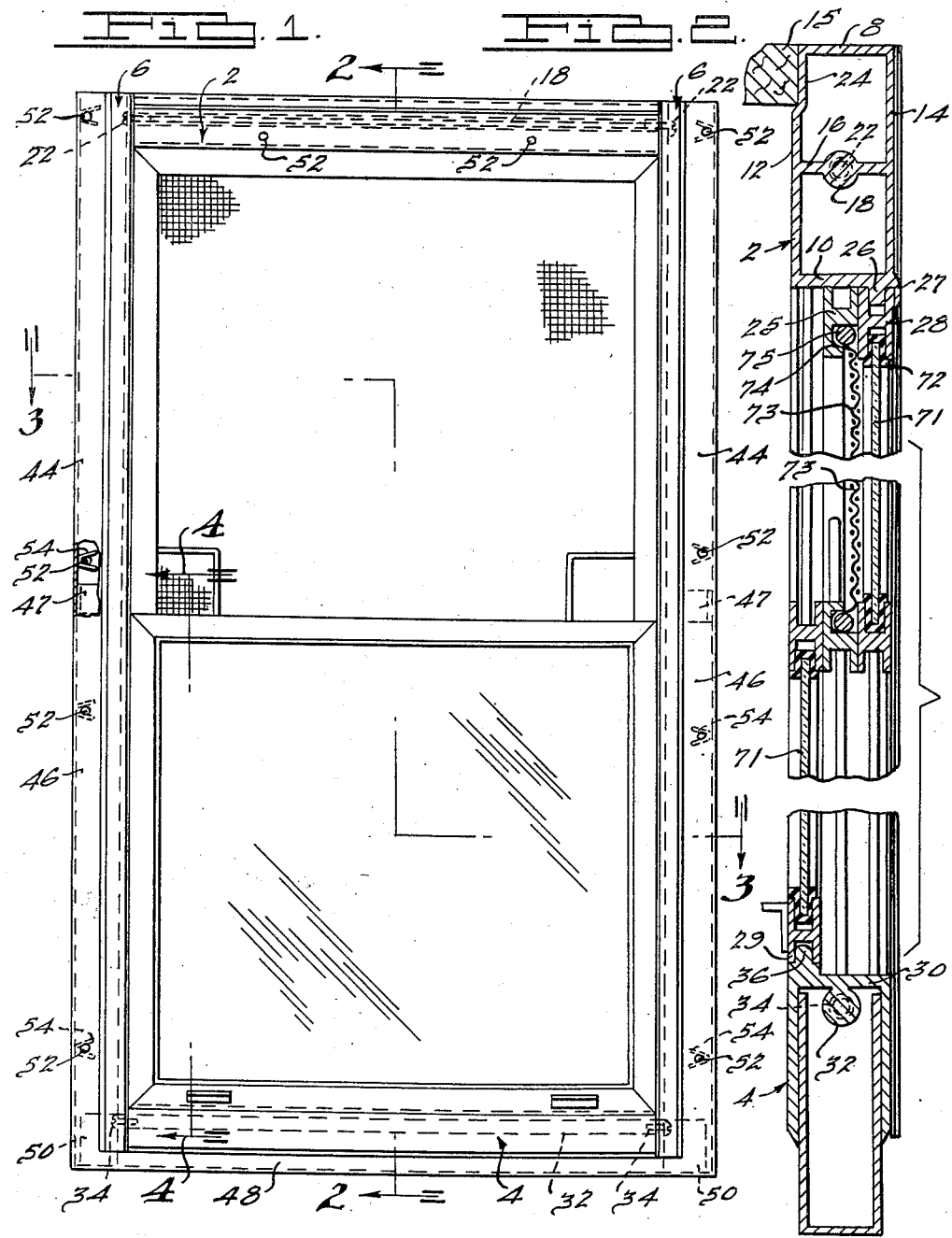
INVENTOR.
Gunnar V. Carlson.
BY
Harness, Dickey & Pierce
ATTORNEYS

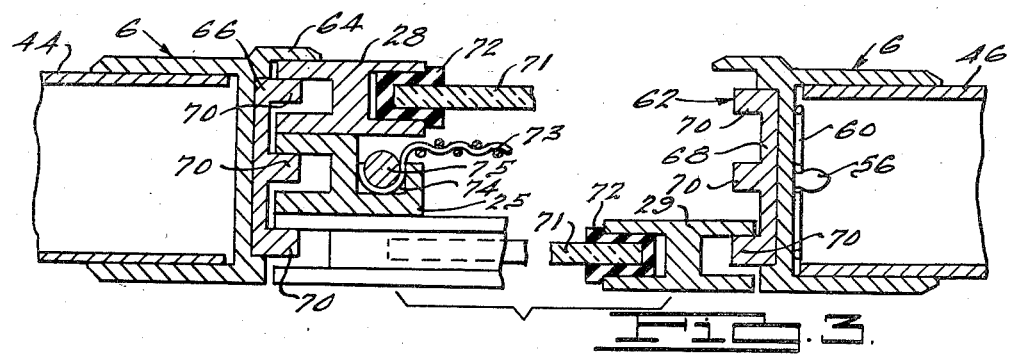
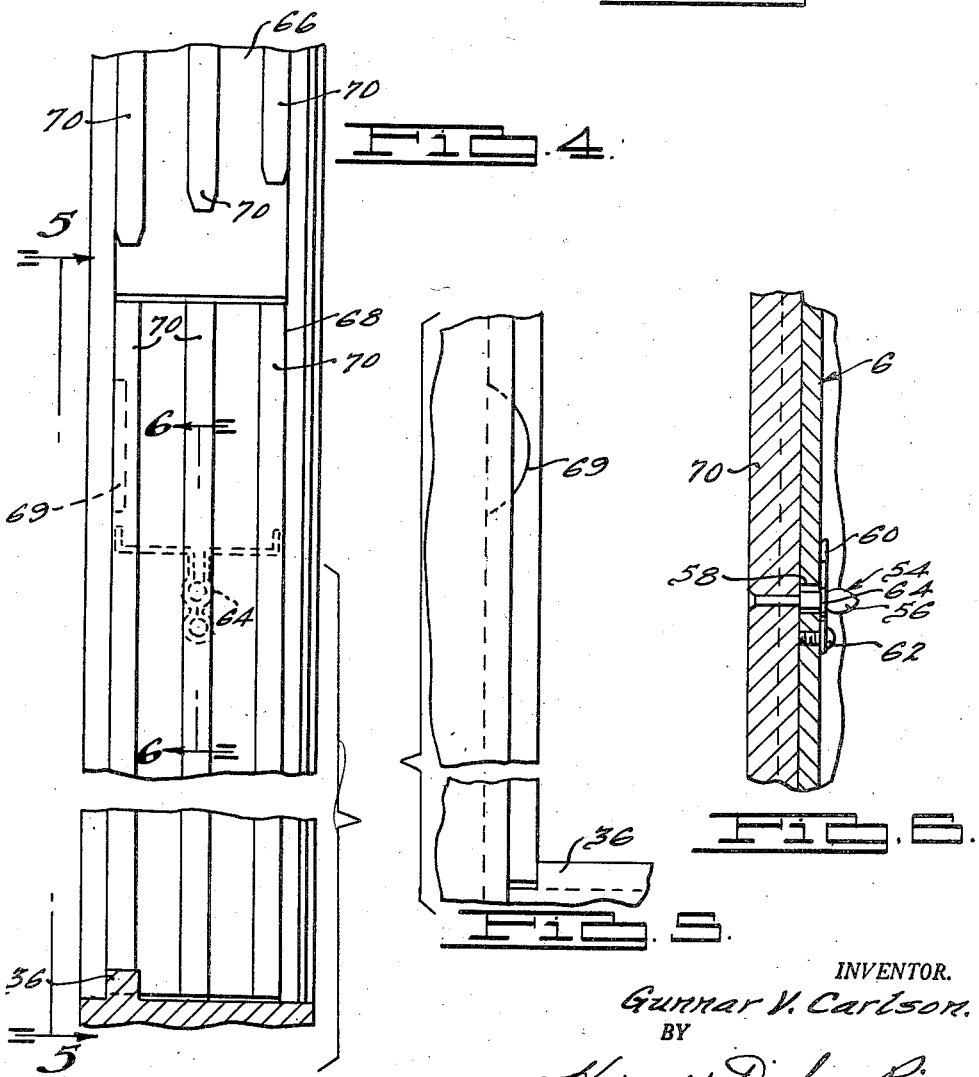

Feb. 5, 1957
G. V. CARLSON
2,780,327
WINDOW FRAME CONSTRUCTION
Filed April 29, 1953
3 Sheets-Sheet 3
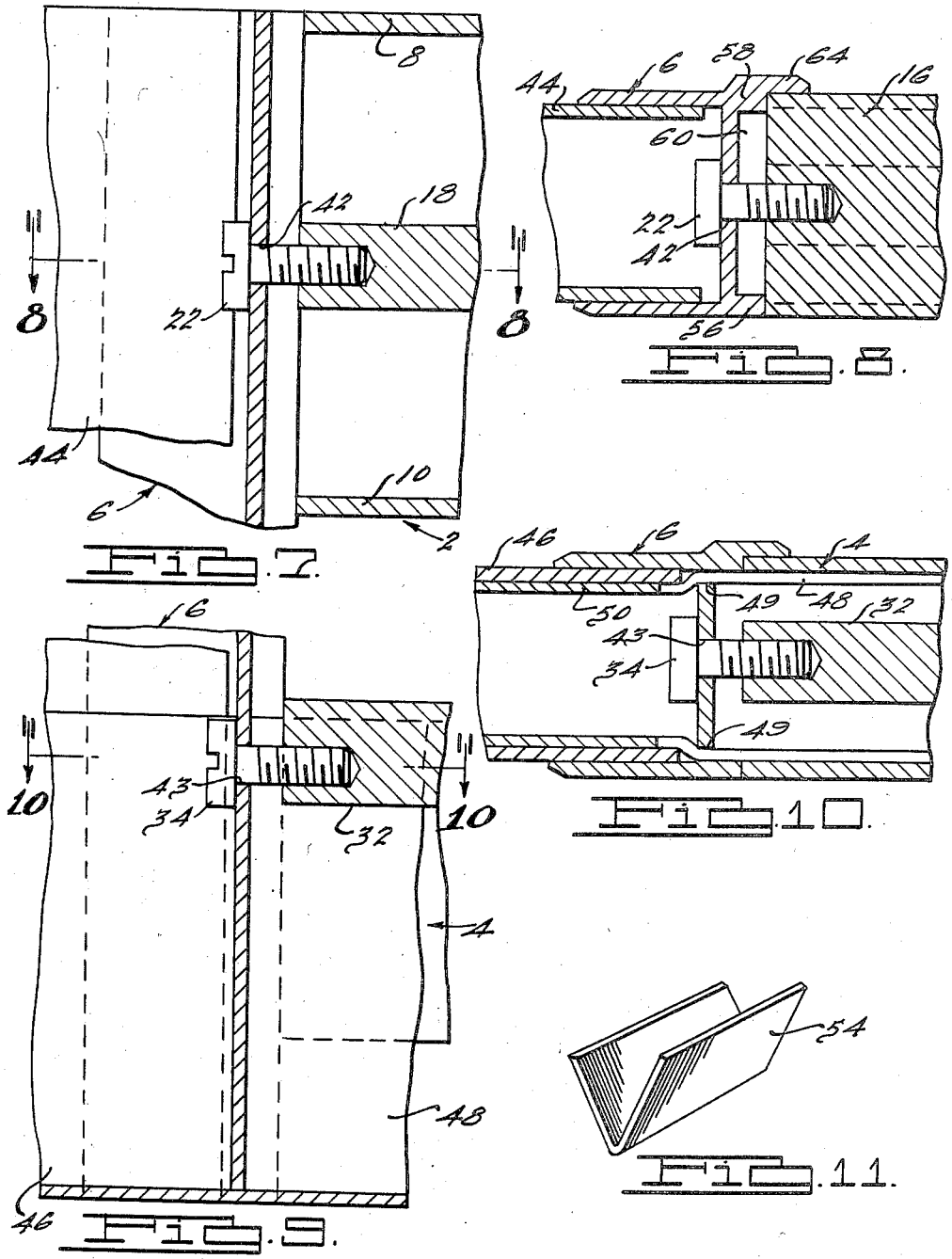
INVENTOR.
Gunnar V. Carlson.
BY
Harness, Dickey & Pierce
ATTORNEYS.

United States Patent Office 2,780,327
Patented Feb. 5, 1957

2,780,327
WINDOW FRAME CONSTRUCTION

Gunnar V. Carlson, Detroit, Mich., assignor to Wisco Aluminum Corporation, Detroit, Mich., a corporation of Michigan Application April 29, 1953, Serial No. 351,806

12 Claims. (Cl. 189—75)

This invention relates to a novel window frame construction and, more particularly, to an adjustable window frame construction for a storm window, especially adapted for quantity production and for use in the building industry in instances where it may not be possible or desirable to maintain exact limits for window openings in a building wall.

In recent years, the building industry has endeavored to reduce the cost of high quality housing by quantity production of various standardized building parts, such parts including adjustable window frames which may be used in window openings of slightly varying size. However, it has been found that the old methods for mass producing adjustable window frames are not satisfactory and are inefficient and costly. Using the old methods, it is very difficult to produce a satisfactory adjustable window frame having a construction rigid and strong enough to withstand any twisting or warping of the frame due to the stresses to which the frame members are subjected during the assembly operation. A prime defficiency in the old methods of making adjustable window frames is in the manner of joining the top and bottom frame members to the side frame members. In the past, the method of making a solid joint between the top frame member and side frame members has ordinarily consisted of riveting a bracket or the like having a tapped hole therein to the top frame member, and then securing the side frame member to said bracket by means of a machine screw through a hole in the side frame member. This method of joining the top and side frame members does not produce a sound, mechanical joint and permits these two frame members to move in relation to each other, resulting in a loose joint and service in the field. Failures have resulted in many instances because of the tapped brackets being assembled out of place or by the threads in the brackets being stripped during assembly. In the past, the method of joining the bottom frame member and side frame members ordinarily consisted of a machine screw extending through a hole in a bent tongue which is integral with the side frame member and into a tapped hole located in the bottom frame member. This method of joining the bottom and side frame members is also unsatisfactory because in many instances during the bending of the tongue of the side frame member, a fracture occurs at the bend point which is difficult to detect until the window has been put in service, thereby necessitating replacement of the defective part on the job.

It is, therefore, an object of this invention to provide an improved adjustable window frame construction of simple and rugged character, which is strong and rigid enough to resist any twisting or warping of the various frame portions during assembly of such portions and thereby prevent costly service in the field.

It is a further object of this invention to provide an adjustable window frame having novel top and bottom frame members and an improved method for joining such members to the side frame members which expedites the manufacture of such adjustable window frames and eliminates costly service operations on the job.

Other objects and advantages of the invention will be apparent in the following specification, the drawings relating thereto, and from the claims hereinafter set forth.

In the drawings:

Figure 1 is an inside face view in elevation of a screen-storm window having a frame made in accordance with the principles of the present invention;

Figure 2 is a vertical sectional view taken substantially on the line 2—2 of Figure 1, showing the cross section of the novel top and bottom frame members of a window made in accordance with this invention;

Figure 3 is a broken view in section taken substantially on the line 3—3 of Figure 1 and looking in the direction of the arrows;

Figure 4 is a fragmentary view partly in section and taken substantially on the line 4—4 of Figure 1 with the sash frames removed;

Figure 5 is a detailed fragmentary view taken substantially on the line 5—5 of Figure 4 and showing the removability of a lower portion of the sash guide rail;

Figure 6 is a fragmentary view in section taken substantially on the line 6—6 of Figure 4 and showing the holding clip for the lower removable sash rail portion;

Figure 7 is a partial elevational view in section showing a detail of the construction of the upper left-hand corner of the window frame of Figure 1;

Figure 8 is a sectional view taken substantially on the line 8—8 of Figure 7;

Figure 9 is a partial elevational view in section showing a detail of the construction of the lower left-hand corner of the window frame shown in Figure 1;

Figure 10 is a sectional view taken substanitally on the line 10—10 of Figure 9; and Figure 11 is a perspective view of the reinforcing element used in fastening the window frame in place.

Referring now to the drawings in detail, the illustrative embodiment comprises an adjustable metal window frame having a top member 2, a bottom member 4, and side members 6 fixedly joined to said top and bottom members. As is best seen in Figure 2, the top member 2 is of hollow, generally rectangular construction having an upper horizontal end part 8, a lower horizontal end part 10 integrally joined by two substantially vertical parts 12 and 14. The top frame member 2 is also provided with an integral transverse web 16 extending longitudinally therethrough and located midway between the upper and lower end parts 8 and 10, and having a medial enlargement 18 of sufficient size so that a hole can be drilled in the ends thereof to receive self-tapping fastening screws 22 for holding the side members 6 to said top member 2. The transverse web 16 may be extruded as an integral part of top member 2. The inner vertical part 12 of top frame member 2 is provided at its upper end with an offset portion 24 adapted for abutment against the building 15 to which the window is being assembled. The lower end part 10 of top frame member 2 is provided with two spaced longitudinal projections 26 and 27 at the outer end thereof, said projections depending downwardly to cooperate with the top channel in the sash frame 28 to provide an effective weather seal. The bottom frame member 4 is substantially inverted U-shaped in cross section, with the bight portion 30 thereof having an integrally formed and medially disposed depending bead 32. The bead 32 extends longitudinally through bottom member 4 and is substantially the same size as the medial enlargement 18 on the top member 2, and is drilled from the ends thereof to provide a hole for the reception of self-tapping fastening screws 34 for securing the side members 6 to said bottom frame member 4. The bottom frame member 4 is provided on the inner edge of the bight portion with a longitudinal projection 36 extending upwardly therefrom and adapted to cooperate with the outwardly directed lower channel in the sash frame 29.

As is best seen in Figures 3, 8 and 10, the side members 6 are open channels with the openings being at the outer edges and with the bight portion thereof along the inner side of the frame. The upper and lower ends of side members 6 are provided with holes 42 and 43 respectively through which the self-tapping screws 22 and 34 are mounted and threadably joined to the medial enlargement 18 of the top member 2, and to the bead member 32 of the bottom member 4. Each side member 6 is provided with a pair of upper and lower telescoping side edge members 44 and 46 respectively which are slidably received in the outwardly opening recesses in each side member. The side edge members 44, 46 are channel shaped in cross section, having their openings extending inwardly and the bight portion outwardly. As is best seen in Figure 1, the lower portion of each side edge member 44 telescopically receives the reduced upper portion of each side edge member 46 to form the joint 47. The bottom member 4 telescopically receives a channel-shaped edge member 48 having the channel opening faced inwardly. The lower edge member 48 has reduced end portions 50 which are telescopically received into the lower ends of side edge members 46. The lower ends of side members 6 are provided with slots 49 through which reduced end portions 50 pass and telescopically engage the side edge portions 46. As is best seen in Figure 3, the side edge portions 44 and 46 are adjustable in side member 6 to permit said parts to be moved relative to each other and thereby allow the present type window to be fitted into window openings of slightly varying size.

The window is secured in place in a building wall by any suitable fastening means such as screws 52 passing through the top member 2 and side edge members 44 and 46. To prevent any crushing or bending of the side edge members 44 and 46 during the assembly to the building wall, there is provided between the channel portions of said members a V-shaped reinforcing member 54 at each screw 52. A detail of member 54 is shown in Figure 11.

As is best seen in Figures 3, 8 and 10, the side members 6 are provided at the inner sides thereof with two inwardly extending flange portions 56 and 58 forming therebetween a recess 60 in which is mounted guide rails 62. The outer flange 58 is provided with an offset extension thereof 64 which overlaps the top and bottom members 2, 4 and cooperates with guide rails 62 to form a guide for the side channels in sash frame 28. The guide rails 62 comprise two upper stationary portions 66 permanently fastened to the side members 6 as by welding and two lower removable portions 68. The guide rails 62 have three inwardly extending longitudinal ribs 70, which cooperate to form a triple track for slidably mounting the sash frames 25, 28 and 29.

The removable guide rails 68 are seated within the recess 60 of the side members 6 and are held therein by means of the projection 36 on the bottom member 4, and a detachable fastening means 54, which comprises a pin 56 fixedly located in the intermediate portion of the guide rail 68 and extending outwardly through a hole 58 in the side member 6. On the inside of the channel of the side member 6, there is provided a spring clip 60 fixed in position by any suitable means such as screw 62. The spring clip 60 is provided with an enlarged intermediate portion 64 through which the head of pin 56 is adapted to extend. As is best seen in Figure 5, the inner edge of removable guide member 68 is provided with a notched out recess 69 to permit the insertion of a tool, such as a screw driver or knife blade. In order to remove the guide rails 68, the sash frames are first moved to the upper portion of the window frame. The next step is to insert a tool such as a screw driver in the recess 69 and exert a prying action on the tool to release the pin 56 from the clip 60. After both guide rail portions 68 have been removed the sash frames may then be moved to the lower portion of the window frame and taken out.

The illustrative embodiment of the invention includes three sash frames 25, 28 and 29. The sash frames 28 and 29 each carry a sheet of window glass 71 and the sash frame 25 carries a sheet of screen material 73. The two glass sash frames 28 and 29 are provided with outwardly extending channels at their outer edges which co-act with the outer longitudinal ribs 70 on the guide rails 62, and inwardly extending channels adapted to receive an inverted, U-shaped resilient weather strip 72 which is made of a suitable material such as rubber or the like. The weather strip 72 is adapted to receive the edges of the glass plate 71. The screen-sash frame 25 is shown as being disposed between the two glass sash frames 28 and 29 and as being provided with similar outwardly extending channel portions on the edges thereof which co-act with the middle flanges 70 on the guide rails 62. The screen sash 25 is provided with a groove 74, adjacent its inner edge, which is adapted to receive the fly screen 73. The fly screen 73 is secured in place by a resilient retaining member 75.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A window frame comprising a formed metal top member of hollow cross section having a transverse web at substantially the middle thereof and extending longitudinally therethrough, a formed metal bottom member, a pair of formed metal side members having the ends thereof abutting the ends of said top and bottom members, and means detachably fastening said side members at the ends thereof to the transverse web of said top member and to the bottom member to form a solid and rigid structure.

2. A window frame comprising a formed metal top member of hollow cross section having a transverse web at substantially the middle thereof and extending longitudinally therethrough, a formed metal bottom member having an inverted U-shaped cross section with a medially disposed depending bead, a pair of formed metal side members having the ends thereof arranged in right angular abutment to the ends of said top and bottom members, and means detachably fastening said side members at the ends thereof to the transverse web of said top member and to the medially disposed depending bead of said bottom member to form a solid and rigid structure.

3. A window frame comprising a formed metal top member of hollow cross section having a transverse web extending longitudinally therethrough, said web having a medially enlarged portion, a formed metal bottom member having an inverted U-shaped cross section with a medially disposed depending bead, a pair of formed metal side members having the ends thereof arranged in right angular abutment to the ends of said top and bottom members, and means detachably fastening said side members at the ends thereof to the medially enlarged portion on the transverse web of said top member and to the medially disposed depending bead of said bottom member to form a solid and rigid structure.

4. A window frame comprising a formed metal top member of hollow cross section having a transverse web extending longitudinally therethrough, said web being spaced midway between the upper and lower portions of said top member, a formed metal bottom member having an inverted U-shaped cross section with a medially disposed depending bead, a pair of formed metal side members having the ends thereof arranged in right angular abutment to the ends of said top and bottom members, and means detachably fastening said side members at the ends thereof to the transverse web of said top member and to the medially disposed depending bead of said bottom member to form a solid and rigid structure.

5. A window frame comprising a formed metal top member of hollow cross section having a transverse web extending longitudinally therethrough, said web being spaced midway between the upper and lower portions of said top member and having a medially enlarged portion, a formed metal bottom member having an inverted U-shaped cross section with a medially disposed depending bead, a pair of formed metal side members having the ends thereof arranged in right angular abutment to the ends of said top and bottom members, and means detachably fastening said side members at the ends thereof to the medially enlarged portion on the transverse web of said top member and to the medially disposed depending bead of said bottom member to form a solid and rigid structure.

6. In a metal window frame, a formed upper member having a substantially rectangular hollow cross section, a longitudinally extending transverse web in and at substantially the middle of said hollow section terminating flush with the end of the section and reinforcing the same transversely, and a medially enlarged portion on said transverse web adapted to have an opening drilled therein and to accommodate and hold a screw threaded into said opening.

7. In a metal window frame, a formed upper member having a substantially rectangular cross section, a longitudinally extending transverse web in said hollow section being spaced substantially midway between the upper and lower portions of said top member, and a medially enlarged portion on said transverse web having the outer ends thereof adapted to receive a fastening means for connecting said upper member to the frame side members.

8. In a metal window frame, a formed upper member of substantially rectangular hollow cross section comprising, horizontally disposed upper and lower end members, a pair of substantially vertical side members integrally formed with said end members, a transverse web extending longitudinally between said two vertical side members and substantially midway between said upper and lower end members, and a medially enlarged portion on said transverse web having the outer ends thereof adapted to receive a fastening means for connecting said upper member to the frame side members.

9. In a window construction, a formed metal frame member having a hollow cross section, an integrally formed longitudinal web bisecting said hollow frame member and extending transversely from one side to the other thereof, a formed metal channel-shaped frame member arranged in right angular abutment to the end of said hollow frame member and with the bight portions thereof at the inner sides of the frame, and means detachably fastening said abutting channel-shaped member to said web to produce a solid and rigid frame joint.

10. In a window construction, a formed metal frame member having a hollow cross section, an integrally formed longitudinal web bisecting said hollow frame member and extending transversely from one side to the other thereof, a medially enlarged portion on said transverse web, a formed metal channel-shaped frame member arranged in right angular abutment to the end of said hollow frame member and with the bight portions thereof at the inner sides of the frame, and means detachably fastening said abutting channel-shaped member to said medially enlarged portion on said web to produce a solid and rigid frame joint.

11. In a window construction, a formed metal frame member of substantially rectangular hollow cross section, an integrally formed longitudinal web in said hollow frame member and extending transversely from one side to the other thereof midway between the upper and lower portions of said hollow frame member, a medially enlarged portion on said transverse web having the ends thereof adapted to receive a fastening means, a formed metal channel-shaped frame member arranged in right angular abutment to the end of said hollow frame member and with the bight portions thereof at the inner sides of the frame, and means detachably fastening said abutting channel-shaped member to said medially enlarged portion on said web to produce a solid and rigid frame joint.

12. In a window construction, a substantially rectangular frame comprising, a formed metal top member of hollow cross section having an integral longitudinal web bisecting said members and extending transversely from one side to the other thereof, a formed metal bottom member having an inverted U-shaped cross section, the terminal surfaces of said top and bottom members abutting against complemental surfaces on the side members of said frame, and means detachably fastening the top and bottom members securely together to hold the complemental surfaces solidly and in mutually pressed relation.

References Cited in the file of this patent

UNITED STATES PATENTS

| 2,130,399 | Rypinski | Sept. 20, 1938 |
| 2,564,264 | Knott | Aug. 14, 1951 |

OTHER REFERENCES

Publication, "Designing with Aluminum Extrusions," by Reynolds Metals Co., 1952 (pp. 18 and 49).